Dec. 27, 1927.
P. FABER
1,653,845
COOLING OF DYNAMO ELECTRIC MACHINES
Filed June 18, 1925
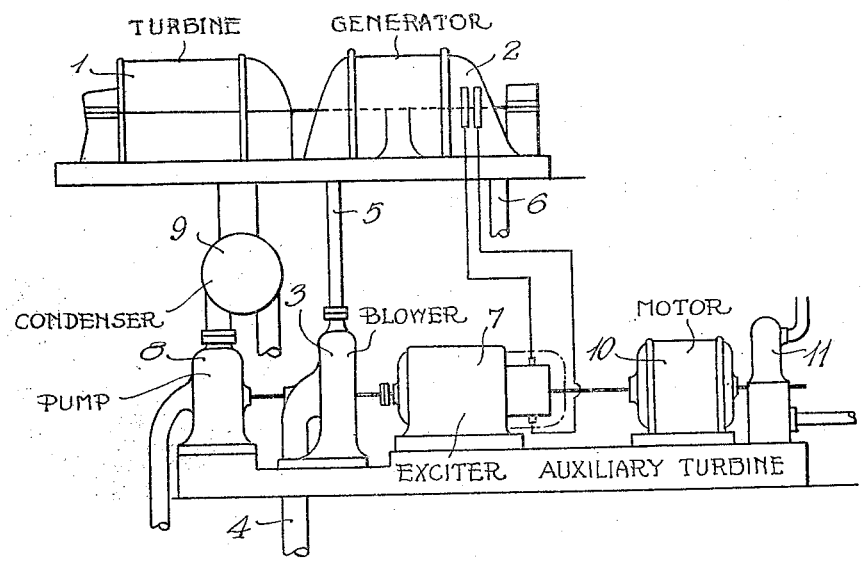

Patented Dec. 27, 1927.

1,653,845

UNITED STATES PATENT OFFICE.

PAUL FABER, OF BADEN, SWITZERLAND, ASSIGNOR TO AKTIENGESELLSCHAFT BROWN, BOVERI AND CIE., OF BADEN, SWITZERLAND.

COOLING OF DYNAMO-ELECTRIC MACHINES.

Application filed June 18, 1925, Serial No. 38,110, and in Germany May 24, 1924.

This invention relates to cooling of dynamo-electric machines and has, among its objects, the provision of a cooling system for such machines having an independently propelled fluid circulating machine for supplying cooling fluids to the dynamo-electric machine, and automatic means for protecting the dynamo-electric machines upon failure of the cooling fluid supply.

Electrical generators are cooled by fans, which as a rule are fitted on to the rotor of the generator. It has also been proposed to mount and drive these fans independently. With this arrangement there is the danger that if the fan fails the generator will become warm and burn. The object of the present invention is to guard against this risk by providing a common drive for the fan and the exciter, by means of an electric motor, a steam turbine, or both. Should this auxiliary group become stationary, on account of failure of the drive, during the working of the generator, the exciting current of the generator would cease at the same time as the supply of ventilating air. Since alternating-current generators are now, almost exclusively used, the unexcited generator would take a large out-of-phase current, which would actuate the main switch and thereby protect the generator from overheating by disconnecting the same.

The generator fan requires a comparatively low angular velocity, which is also of advantage for the exciter from the point of view of safety in working. With this fan-exciter auxiliary group of the generator other machines may also be connected, for example the cooling-water pump of the generator air-cooler, or the circulating pump of the condensing plant, air pump or the like.

The abovementioned auxiliary group of the generator is preferably driven by an electric motor and a turbine. The turbine normally runs light, but takes over the driving of the auxiliary group upon failure of the motor drive.

An example of an embodiment of the invention is illustrated in the accompanying drawing, the single figure of which is a diagrammatic view of a power generating station made according to the invention.

A steam turbine 1 which is of familiar design, is directly coupled to an alternating-current generator 2, the two directly coupled machines constituting what may be termed the power generating aggregate. The alternating-current generator of this aggregate is arranged to be excited from an independently driven exciter 7 of familiar construction, and, as explained above, the air for cooling the generator is also arranged to be supplied by a suitable fan or blower 3, which is mechanically coupled to the exciter and arranged to be driven therewith as a single unit. Accordingly, if for some reason or other the independently driven fan should fail and the supply of cooling air to the generator 2 should cease, the excitation to the generator, which is derived from a machine that is mechanically coupled to the blower, will also cease, causing the generator 2 to be disconnected from the line and put out of operation.

The circulation of the air from the blower through the generator may be effected by means of suitable air conduits, the drawing showing a suction pipe 4, a delivery pipe 5 leading from the blower to the generator and an exhaust pipe 6 through which the air leaves the generator.

The auxiliary blower-exciter unit or aggregate for supplying cooling air and exciting current to the main power aggregate is arranged to be driven independently of the latter by means of a combined steam-electric drive comprising an electric motor 10 and an auxiliary turbine 11. This drive is so arranged that power for driving the auxiliary unit is normally supplied by the electric driving motor 10, the turbine 11 running light but the latter taking over the driving of the blower-exciter unit upon failure of the electric motor.

The auxiliary aggregate, comprising the blower 3 and the exciter 7, may also be utilized with advantage for driving the auxiliaries of the steam turbine unit as, for instance, a pump 8 which supplies cooling water to the condenser 9 of the steam turbine 1, the pump being directly coupled to the blower-exciter unit and driven therewith.

What I claim is:—

1. The combination with a dynamo-electric machine having an independently driven fluid propelling unit for circulating a cooling fluid through said machine to cool the latter, of means for supplying exciting current to said dynamo-electric machine, said means comprising a unit independent of said generator, said unit being so associated with said fluid propelling machine as to cease supplying exciting current to said dynamo-electric machine when said fluid propelling machine ceases to propel cooling fluid through said dynamo-electric machine.

2. The combination with a power aggregate comprising an alternating current generator and a prime mover for driving the same, of an auxiliary aggregate comprising a fluid propelling machine for circulating cooling fluid through said generator and an exciter for supplying exciting current to said generator, said fluid propelling machine and said exciter having a common drive independent of the drive of said generator.

3. The combination with an alternating-current machine, of an auxiliary aggregate for said machine, said aggregate comprising a fluid propelling machine for circulating cooling fluid through said generator and an exciter for supplying exciting current to said generator, said fluid circulating machine and said exciter being coupled and rotated independently of said alternating current machine.

4. The combination with an alternating-current generator and a prime mover for driving the latter, of an auxiliary aggregate comprising a fluid propelling machine for circulating cooling fluid through said generator, a rotary exciter for supplying exciting current to said generator, said fluid propelling machine being directly coupled to said exciter, and an auxiliary motor drive for rotating said auxiliary aggregate independently of the rotation of said generator.

In testimony whereof I have signed my name to this specification.

PAUL FABER.